Sept. 11, 1934.   G. R. CARLSON   1,973,140
ADJUSTABLE ILLUMINATING DEVICE FOR HYDROMETERS
Filed Oct. 11, 1933   2 Sheets-Sheet 1
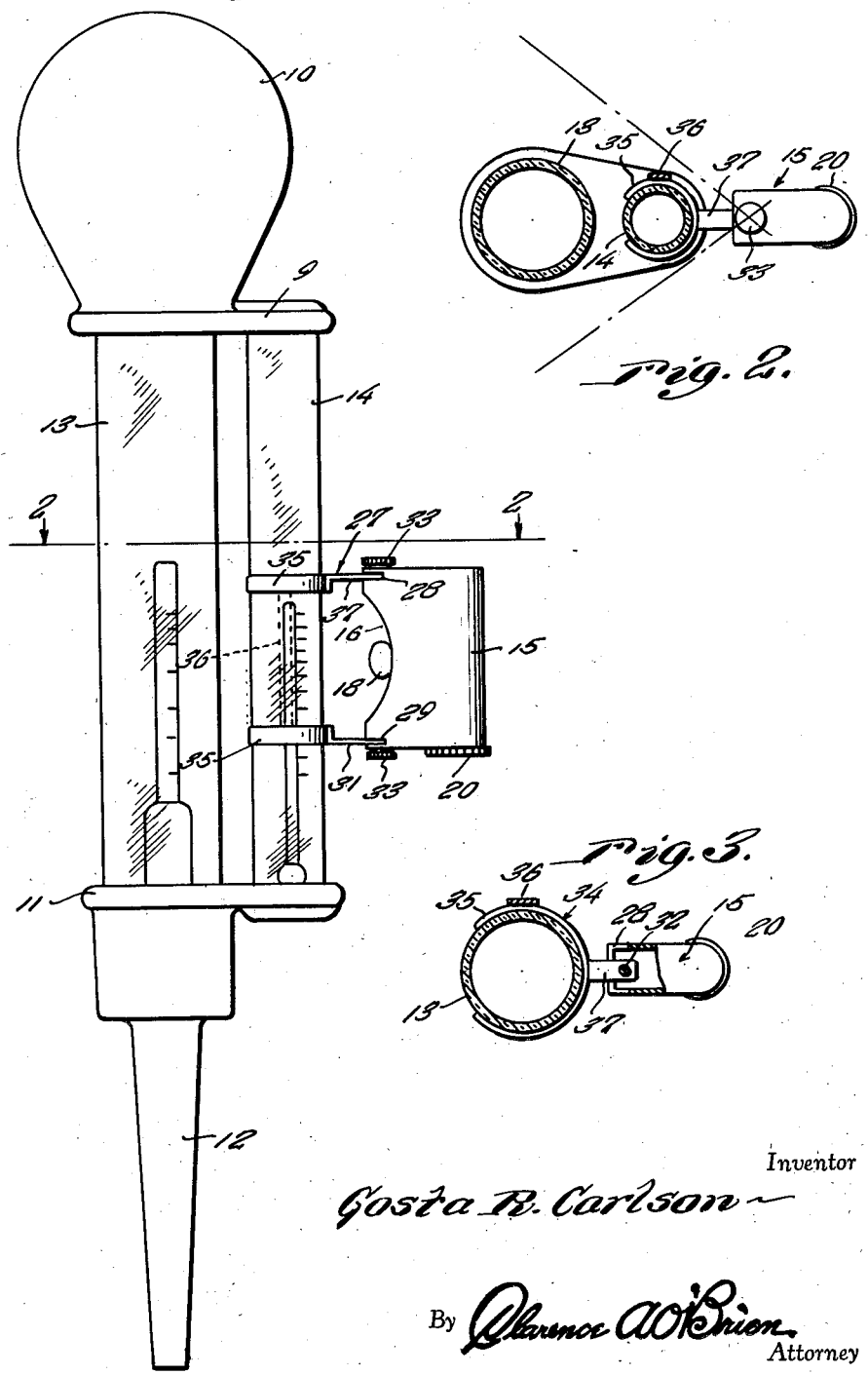
Inventor
Gosta R. Carlson
By Clarence A. O'Brien
Attorney Sept. 11, 1934.    G. R. CARLSON    1,973,140
ADJUSTABLE ILLUMINATING DEVICE FOR HYDROMETERS
Filed Oct. 11, 1933    2 Sheets-Sheet 2
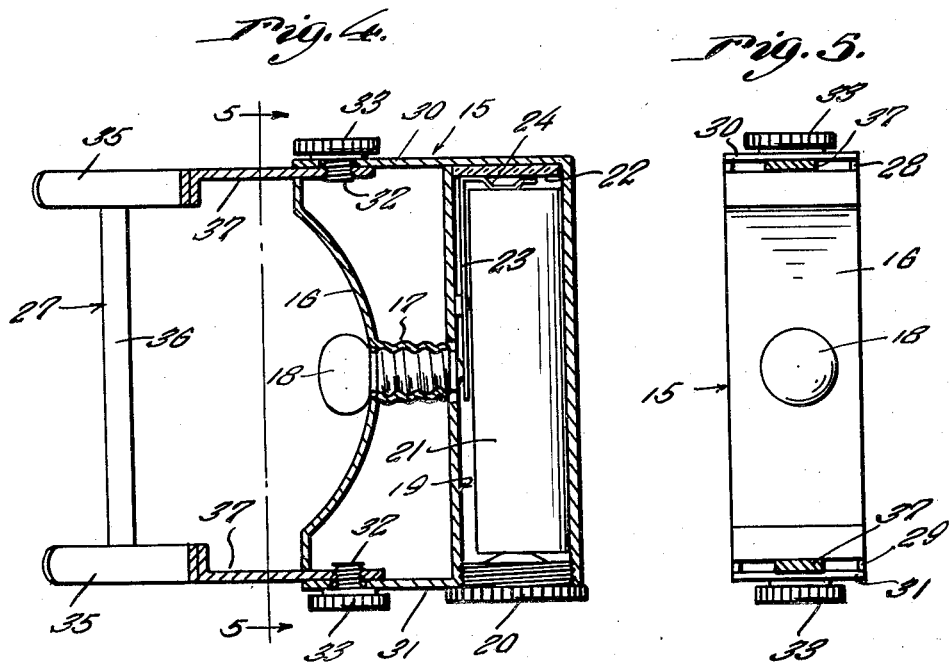
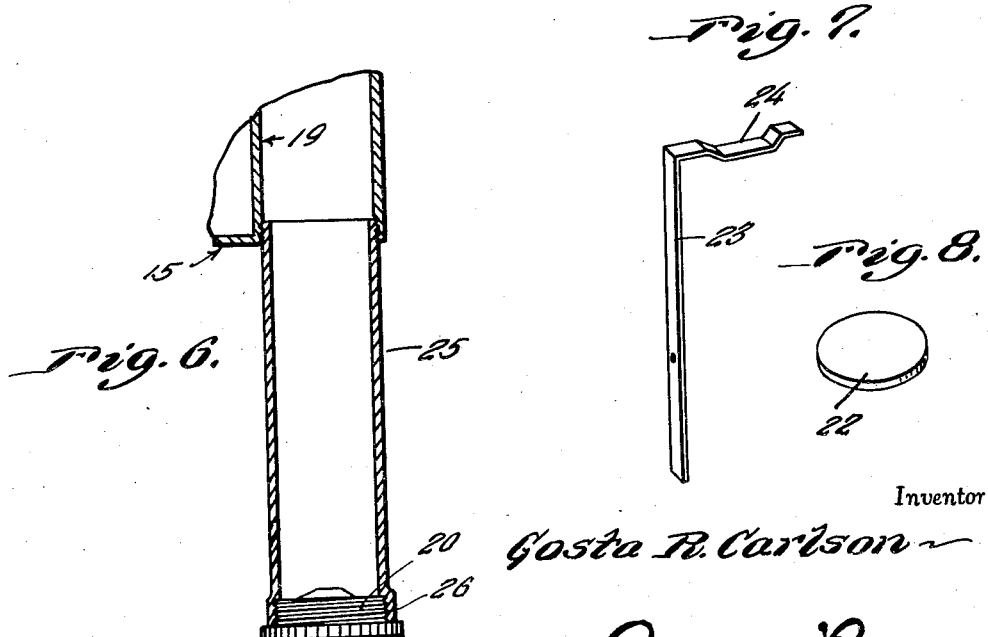
Inventor
Gosta R. Carlson
By Clarence A. O'Brien
Attorney Patented Sept. 11, 1934

1,973,140

UNITED STATES PATENT OFFICE 1,973,140

ADJUSTABLE ILLUMINATING DEVICE FOR HYDROMETERS

Gosta Richard Carlson, Metuchen, N. J.

Application October 11, 1933, Serial No. 693,180

2 Claims. (Cl. 240—6.4)

This invention relates to a structurally refined and appreciably improved self-contained illuminating device for use in association with fluid indicating tubes of hydrometers and the like, particularly the type used for testing water in automobile radiators.

These hydrometers are generally of the duplex type, that is, are provided with spaced parallel graduated tubes. In some instances, a single graduated glass gauge tube is employed. The single glass tube idea is shown in the hydrometer depicted in a patent granted to me under number 1,924,024, August 22, 1933. By contrast, the double or duplex style of hydrometer is shown in the present application.

It follows that the present application includes an improved adjustable type illuminating device which may be used either with a single or double tube hydrometer. In the previous patent referred to, it will be observed that the illuminating device, in which the novelty is claimed, comprises a block-like body formed with a socket constituting a receptacle for a dry cell battery, said body serving as a support for a bulb and being fashioned with a semi-circular recess in one longitudinal edge defining a reflector for the bulb. Suitable means is provided for conveying the current from the battery to the bulb and the body is provided with upper and lower clamps or clips adapted to embrace the gauge glass of the hydrometer in such a manner as to permit the beam of light to be thrown on the tube to facilitate testing and inspection.

By comparison, it will be observed that the device of this application embodies certain of the fundamental parts above described, but includes a double clip or clamp unit having upper and lower arms pivotally fastened to the illuminating device so as to permit the latter device to be angularly adjusted with respect to the hydrometer to permit the light beam to be adjusted for more accurate and convenient inspection and gauge reading purposes.

Other features and advantages will become more readily apparent from the following description and drawings.

In the drawings:—

Figure 1 is an elevational view of a conventional double type hydrometer, showing the adjustable illuminating device associated with the smaller gauge glass or tube.

Figure 2 is a horizontal sectional view taken approximately on the plane of the line 2—2 of Figure 1.

Figure 3 is a view similar to Figure 2, showing a slight modification, such as is used in connection with a single tube or glass hydrometer.

Figure 4 is a view in section and elevation, showing the complete attachment with its parts in assembled relationship to disclose the specific details.

Figure 5 is a section on the line 5—5 of Figure 4.

Figure 6 is a view showing a detachable extension tube adapted to accommodate an elongated dry cell battery whenever the latter type of battery is needed.

Figures 7 and 8 are perspective detail views.

The hydrometer shown in Figure 1, which is a conventional automobile type, embodies an upper mounting 9 carrying the rubber bulb 10 and a lower mounting 11 carrying a nozzle 12. The customary transparent graduated glass tubes, which are arranged in spaced parallelism, are mounted between these two so-called mountings 9 and 11. The large tube is indicated by the numeral 13 and the smaller one by the numeral 14. Incidentally, the invention, as before indicated, is intended to be used either on the single or double type tube. This necessitates the provision of two different styles or forms of attaching units for the illuminating devices. I will describe first the illuminating device per se, since it is usable in connection with either type of attaching unit. This device comprises a casing designated as a unit by the numeral 15. As shown in Figure 4, the casing is of general rectangular form and one longitudinal edge is formed with a substantially semi-circular depression or recess 16 which defines a reflector. This is formed with a screw threaded socket 17 centrally located to take care of the electric bulb 18. The casing includes a cylindrical chamber or receptacle 19 open at one end and internally screw threaded at this end to accommodate a removable screw plug or cap 20. This serves to hold in place the battery 21 which is located in the receptacle. At the opposite end of the receptacle is an insulation disk 22 and associated with this and the battery is an L-shaped contact member. The long arm 23 is interposed between one wall of the receptacle and the battery and attached to said wall and located to engage the bulb contact, as shown in Figure 4. The shorter arm 24 is located between the disk 22 and the customary contact end of the battery or dry cell 21. Obviously, by screwing in on the plug 20, the circuit can be closed for illuminating the bulb and the rays of light will be projected by the reflector surface 16. Fundamentally, this is somewhat the same as the corresponding device illustrated in Patent 1,924,024, previously mentioned.

By strict comparison of the present battery and light holder with the previous patented type, it will be observed that certain structural distinctions exist. For example, the open end of the receptacle 19, which serves as a container for the battery, is internally screw threaded to accommodate the cap 20. This also serves to accommodate the screw threaded end of an extension tube 25 which, as shown in Figure 6, is used sometimes to provide an elongated receptacle for a longer battery. The outer end of this tube 25 is internally screw threaded, as indicated at 26, to accommodate the same plug or closing cap 20. This is one improvement.

The second improvement is predicated upon the construction of the casing which permits it to be pivotally and adjustably connected with the attaching unit 27. For example, as shown in Figure 5, it will be observed that above and below the reflecting surface 16, the casing is formed with accommodation or adaptor slots 28 and 29. Moreover, the top and bottom walls 30 and 31 of the casing are apertured to accommodate pivot and clamping screws 32 provided with finger grips 33. These screws not only serve as pivots to provide a pivotal connection between the illuminating device 15 and the attaching device 27, but also as locking members so as to permit the two parts to be fixedly connected together whenever circumstances require it. By pivotally connecting the casing with the attaching unit 27, the casing can be adjusted on the arms 37 so as to direct the light rays from the lamp 18 against one tube of the hydrometer, while the device is attached to the other tube thereof.

The attaching clamp or unit 27 is designed for use in connection with the small tube 14. Inasmuch as some hydrometers include only the single larger tube 13, it is necessary to use a slightly different form of attaching clamp or unit 34. Structurally, both of these parts 27 and 34 are the same, with the exception of their proportions. Therefore, a description of one will suffice for both, it being observed that each unit or device comprises a pair of upper and lower spring clips 35 adapted to embrace the glass tube, these clips being joined together for the sake of rigidity by a tie bar or connecting strap 36. Upper and lower arms 37 of a duplicate type are attached to the clips and extend in superposed spaced parallelism through the aforesaid slots 28 and 29. The inner ends of these arms are screw threaded to accommodate the threaded locking and pivoting studs 32. Obviously, by loosening the thumb wheel 33, the two parts 27 and 15 are pivotally joined together and by tightening the studs 32, said parts can be virtually locked together to move as a unit.

So far as the difference in construction between the two units 27 and 34 is concerned, the only principal difference is that the clips in the device 34 shown in Figure 3 are slightly larger to engage the tube 13. In Figure 2, they are somewhat smaller to engage the tube 14. Likewise, it has been found advisable to shorten the arms 37 in the type of unit 34 illustrated in Figure 3. As before stated, both units are fundamentally the same in that each one comprises upper and lower spring clips tied together and provided with arms pivotally and adjustably connected with the slotted portion of the casing 15.

The gist of the invention is the provision of a double clip attaching unit adaptable to the tubes 13 and 14 with a light and battery carrying device or casing 15 pivotally and detachably connected with the arms 37 of the unit. The two units 34 and 27 are interchangeable, but basically the same in construction.

It is thought that the description, taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to, if desired.

I claim:—

1. In a structure of the class described, a battery illuminating device comprising a casing including a battery receptacle, a reflecting surface, a bulb associated with said surface, the reflecting end portion of said casing being provided adjacent the top and bottom with adaptation slots, the top and bottom walls of the casing being provided with openings, an attaching unit including arms extending inwardly and swingably through said slots, said arms being formed with screw threaded openings aligned with the apertures in the top and bottom walls of the casing, screw threaded locking studs provided with thumb wheels, said studs extending through said apertures and into the screw threaded holes in said arms for adjustably, pivotally and detachably connecting the casing with said arms.

2. An illuminating device for hydrometers of the double-tube type comprising a supporting unit including spring clamps for engaging one tube of the hydrometer, supporting arms carried by the clamps, an illuminating device including a bulb and reflecting means, and means for pivotally connecting said device to the free ends of said arms, whereby the device can be adjusted to direct the rays of light from the bulb upon the other tube, and means for locking the device in adjusted position to the unit.

GOSTA RICHARD CARLSON.